(12) United States Patent
Ozaki et al.

(10) Patent No.: US 8,174,845 B2
(45) Date of Patent: May 8, 2012

(54) ELECTRONIC APPARATUS COVER

(75) Inventors: Yukisuke Ozaki, Kobe (JP); Yuusuke Itoh, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 254 days.

(21) Appl. No.: 12/450,061

(22) PCT Filed: Mar. 17, 2008

(86) PCT No.: PCT/JP2008/054851
§ 371 (c)(1),
(2), (4) Date: Sep. 10, 2009

(87) PCT Pub. No.: WO2008/114768
PCT Pub. Date: Sep. 25, 2008

(65) Prior Publication Data
US 2010/0053909 A1  Mar. 4, 2010

(30) Foreign Application Priority Data

Mar. 19, 2007 (JP) ................................. 2007-070197

(51) Int. Cl.
*H05K 7/14* (2006.01)
(52) U.S. Cl. ............... 361/802; 361/679.02; 361/679.01; 361/807; 361/730; 361/731; 361/752; 361/753; 361/736
(58) Field of Classification Search .................. 361/802, 361/679.02, 679.01, 807
See application file for complete search history.

(56) References Cited

U.S. PATENT DOCUMENTS

| | | | |
|---|---|---|---|
| 5,278,808 A * | 1/1994 | Takano | 369/11 |
| 5,610,376 A * | 3/1997 | Takagi et al. | 200/50.01 |
| 5,730,515 A * | 3/1998 | Ho | 312/350 |
| 5,917,435 A | 6/1999 | Kamiya et al. | |
| 6,119,060 A * | 9/2000 | Takayama et al. | 701/36 |
| 6,301,100 B1 * | 10/2001 | Iwata | 361/679.55 |
| 6,590,848 B1 * | 7/2003 | Chen | 720/654 |
| 6,791,844 B2 * | 9/2004 | Tobishima et al. | 361/759 |
| 2004/0204840 A1 | 10/2004 | Hashima et al. | |
| 2005/0122677 A1 * | 6/2005 | Clark et al. | 361/686 |
| 2006/0002079 A1 * | 1/2006 | Xu et al. | 361/686 |

FOREIGN PATENT DOCUMENTS

| | | |
|---|---|---|
| JP | A-04-251486 | 9/1992 |
| JP | A-05-016956 | 1/1993 |
| JP | U-05-019008 | 3/1993 |
| JP | U-06-029948 | 4/1994 |
| JP | A-07-156718 | 6/1995 |
| JP | A-08-258631 | 10/1996 |
| JP | A-08-318792 | 12/1996 |
| JP | A-2001-239895 | 9/2001 |
| JP | A-2002-328026 | 11/2002 |
| JP | A-2003-166848 | 6/2003 |
| JP | A-2005-524570 | 8/2005 |
| WO | WO 03/094286 A2 | 11/2003 |

* cited by examiner

*Primary Examiner* — Tuan T Dinh
*Assistant Examiner* — Steven Sawyer
(74) *Attorney, Agent, or Firm* — Oliff & Berridge, PLC

(57) ABSTRACT

The purpose of the present invention is providing an electronic apparatus cover easily detached in the electronic apparatus cover that protects a connector installed in a recess portion of the electronic apparatus. The present invention is an electronic apparatus cover that covers a first connector for electrically connecting to a portable apparatus of an electronic apparatus that includes a recess portion to which the portable apparatus can be attached and a first engagement portion that engages the portable apparatus, including: a third engagement portion that engages with the first engagement portion.

1 Claim, 17 Drawing Sheets

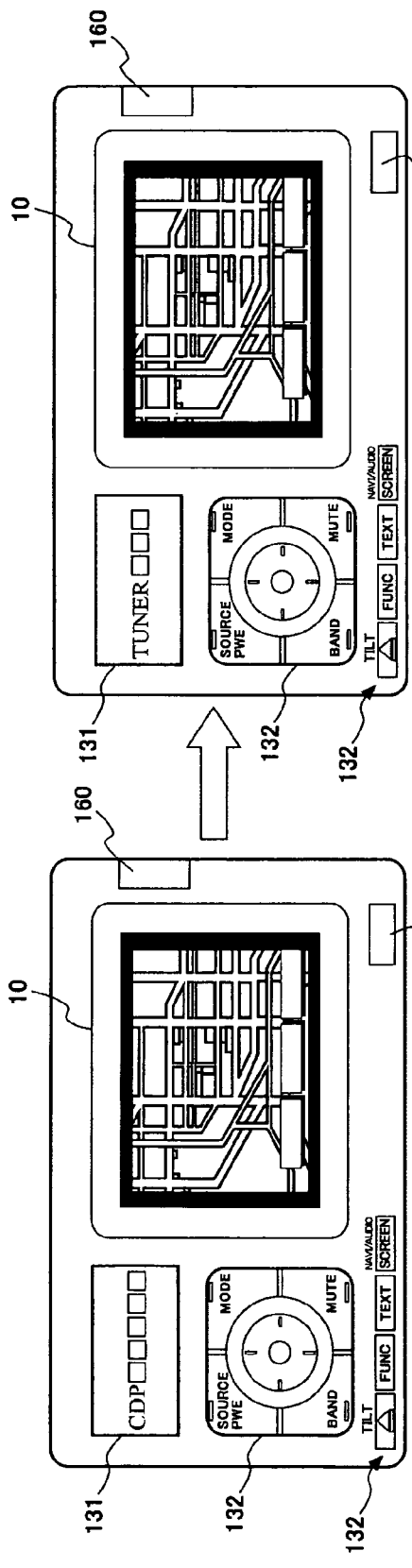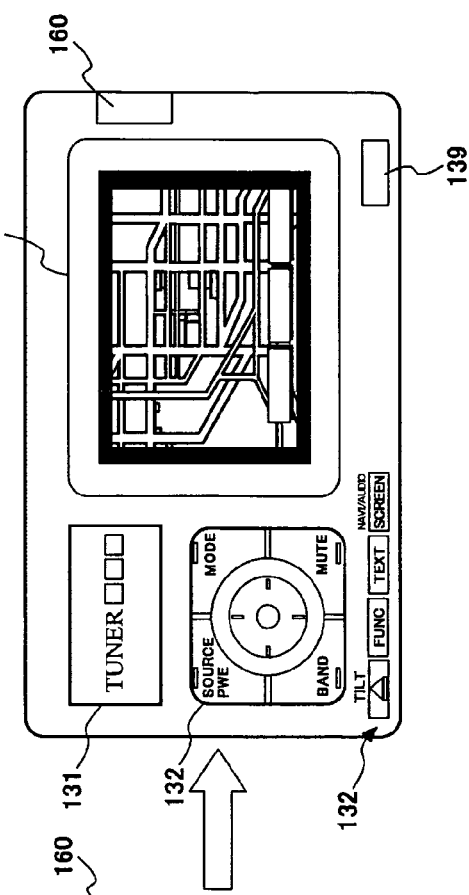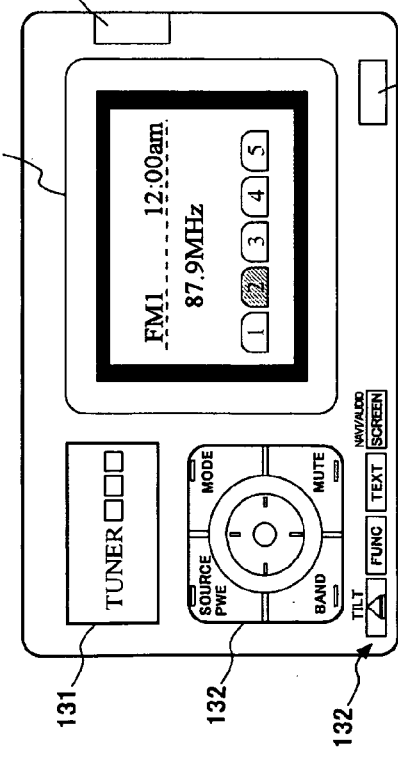

ELECTRONIC APPARATUS COVER

TECHNICAL FIELD

The present invention relates to an electronic apparatus cover, especially relates to an electronic apparatus cover that protects a connector that is provided in a recess portion of the electronic apparatus to which a portable apparatus can be attached.

BACKGROUND ART

As conventional navigation apparatuses, there are widely known small-sized portable navigation apparatuses with simplified structure and portability (hereinafter, referred to as Portable Navi), also known as personal navigation device; and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speed, and some of the in-vehicle navigation apparatuses are equipped with audio devices.

In recent years, the navigation apparatuses with portability of the Portable Navi and high-accuracy guide function of the in-vehicle navigation apparatus have been studied.

Reference 1 and Reference 2 disclose a configuration where a CD unit can be detached from an in-vehicle apparatus. Reference 3 and Reference 4 disclose a configuration where a navigation portion can be detached from an in-vehicle apparatus mounted in a vehicle. By removing the navigation portion from the in-vehicle apparatus, the navigation portion can be used as a Portable Navi of a single unit. Also, as disclosed in Reference 5, the navigation apparatus is taken out of the vehicle and can be used while walking. In addition, when mounted in a vehicle, the navigation apparatus is in a car-navigation mode, and when taken out of the vehicle, the navigation apparatus is in a person-navigation mode.

The navigation portion is attached to, and detached from the in-vehicle apparatus by being inserted and recessed so that the navigation portion is recessed in the recess portion provided at the front of the in-vehicle apparatus for example.

[Reference 1] Japanese Patent Application Publication No. 8-318792
[Reference 2] Japanese Patent Application Publication No. 2002-328026
[Reference 3] Japanese Patent Application Publication No. 2005-524570
[Reference 4] Japanese Patent Application Publication No. 2001-239895
[Reference 5] Japanese Patent Application Publication No. 2003-166848

DISCLOSURE OF THE INVENTION

Problems to be Solved by the Invention

When the navigation portion is detached from the recess portion of the in-vehicle apparatus and used, the recess portion is exposed. There could be provided a connector that couples the navigation portion and the in-vehicle apparatus, in the recess portion. For this reason, there is possibility that dust, fog, or water adhere to the connector. Therefore, providing the cover that fits to the size of the connector of the in-vehicle apparatus can be thought. However, to detach the cover from the connector provided in the recess portion, it is necessary for a user to detach the cover with a method such as bringing the hand directly and peeling a tape. Therefore, detaching is difficult. In addition, when the cover that fits to the connector is provided, a physical appearance becomes unlevel and an exterior appearance is not good, because the connector portion is covered but other recess portions are not covered.

The present invention has been made in view of the above circumstances and provides an electronic apparatus cover easily detached, relating to a cover that protects a connector provided in a recess portion of the electronic apparatus.

Means for Solving the Problems

The present invention is an electronic apparatus cover that covers a first connector for electrically connecting to a portable apparatus of an electric apparatus that includes a recess portion to which the portable apparatus can be attached and a first engagement portion that engages the portable apparatus, characterized by comprising: a second engagement portion that engages with the first engagement portion. According to the present invention, the second engagement portion enables a user to detach and attach the electronic apparatus cover with the same method as the method of detaching or attaching the portable apparatus. In addition, compared to protecting only the first connector, the exterior appearance becomes better.

In the above composition, the electronic apparatus cover may be an electronic apparatus cover to cover whole of the recess portion of the electronic apparatus. With this composition, it is possible to make the exterior appearance further better.

The second engagement portion may be provided on a back side or a lateral side of the electronic apparatus cover. With this composition, it is possible to make the exterior appearance further better.

In the above composition, the portable apparatus may include a second connector to connect to the first connector electrically, and the electronic apparatus cover may include a holding portion that holds a connector cover that protects the second connector. With this composition, it is possible to keep the electronic apparatus cover and the connector cover by the set when the portable apparatus is attached to the electronic apparatus. Therefore, it is possible to reduce the possibility that the electronic apparatus cover and the connector cover are lost.

In the above composition, the holding portion may be provided on a back side or a lateral side of the electronic apparatus cover. With this composition, the holding portion will not destroy the exterior appearance of the electronic apparatus cover.

In the above composition, the holding portion may be another recess portion in which the electronic apparatus cover is recessed. With this composition, the holding portion can hold the connector cover easily.

In the above composition, the electronic apparatus cover may further comprise partition portions that are provided in a rectangular pattern, and the another recess portion that is the holding portion may be composed of the partition portions. With this composition, it is possible to reduce the production cost, because another recess portion is formed by the partition portions for reinforcement.

In the above composition, the electronic apparatus cover may further comprise a display that is provided at the front of the electronic apparatus cover and displays a top and bottom when the electronic apparatus cover is attached to the electronic apparatus. With this composition, it is possible to reduce the possibility that the electronic apparatus cover is attached upside down by mistake.

In the above composition, the electronic apparatus may be an electronic apparatus mounted in a vehicle.

Effects of the Invention

According to the present invention, it is capable of attaching and detaching an electronic apparatus cover with the same method as the method of detaching or attaching a portable apparatus. Therefore, detaching the electronic apparatus cover becomes easy. In addition, an exterior appearance becomes better compared to protecting only a first connector.

BRIEF DESCRIPTION OF THE DRAWINGS

FIG. 7A through FIG. 7D are schematic views of display examples of the portable apparatus attached to the main portion;

BEST MODES FOR CARRYING OUT THE INVENTION

A description will now be given, with reference to the accompanying drawings, of exemplary embodiments of the present invention.

First Embodiment

Figure 1A:
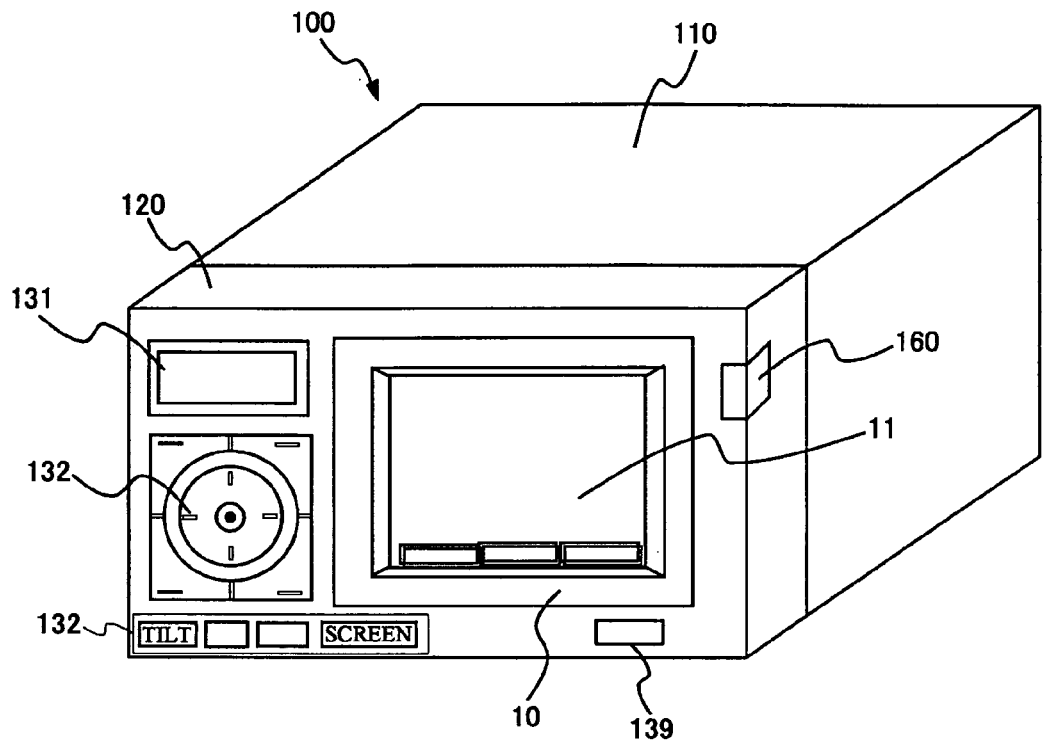
FIG. 1A and FIG. 1B are schematic views illustrating an exterior appearance of an in-vehicle system in accordance with the first embodiment.
Figure 1B:
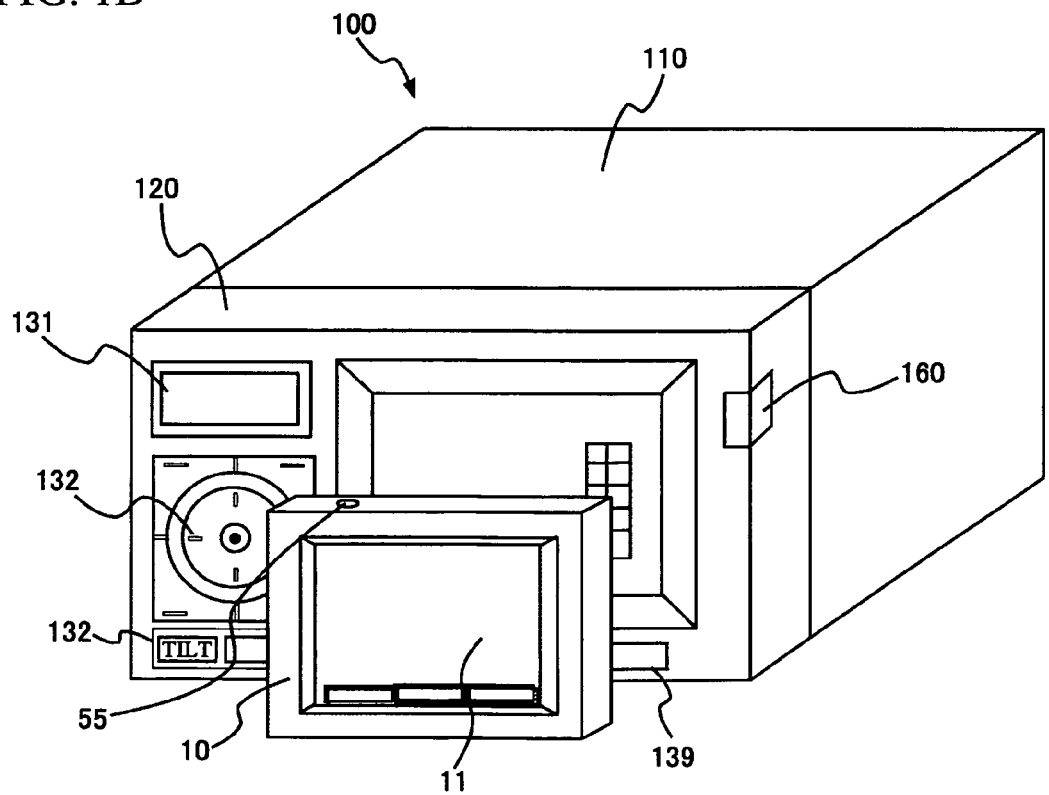

FIG. 1A and FIG. 1B illustrate exterior views of an in-vehicle system 1, as an example of an electronic system that uses an electronic apparatus cover in accordance with the first embodiment. As illustrated in FIG. 1A and FIG. 1B, the in-vehicle system 1 is composed of: an in-vehicle apparatus 100 (electronic apparatus); and a portable apparatus 10 (portable apparatus) with navigation capabilities. The portable apparatus 10 can be used after being attached at a front face portion 120 (displacement portion) of the in-vehicle apparatus 100, as illustrated in FIG. 1A, and can be also used after being detached from the in-vehicle apparatus 100, as illustrated in FIG. 1B. As described above, the portable apparatus 10 can be attached to and detached from the in-vehicle apparatus 100, and it is possible to attach the portable apparatus 10 to the in-vehicle apparatus 100.

The in-vehicle apparatus 100 is capable of playing radio broadcasting or playing music data recorded on a memory medium such as a CD (Compact Disc) or the like, and the in-vehicle apparatus 100 includes: an in-vehicle apparatus main body 110 (main portion) having a CD player and a CD insertion/ejection slot; and the front face portion 120 having a display portion 131 and an operating portion 132. The portable apparatus 10 has navigation capabilities of searching for a guiding path to a destination and displaying the searched guiding path over a map.

Figure 2:
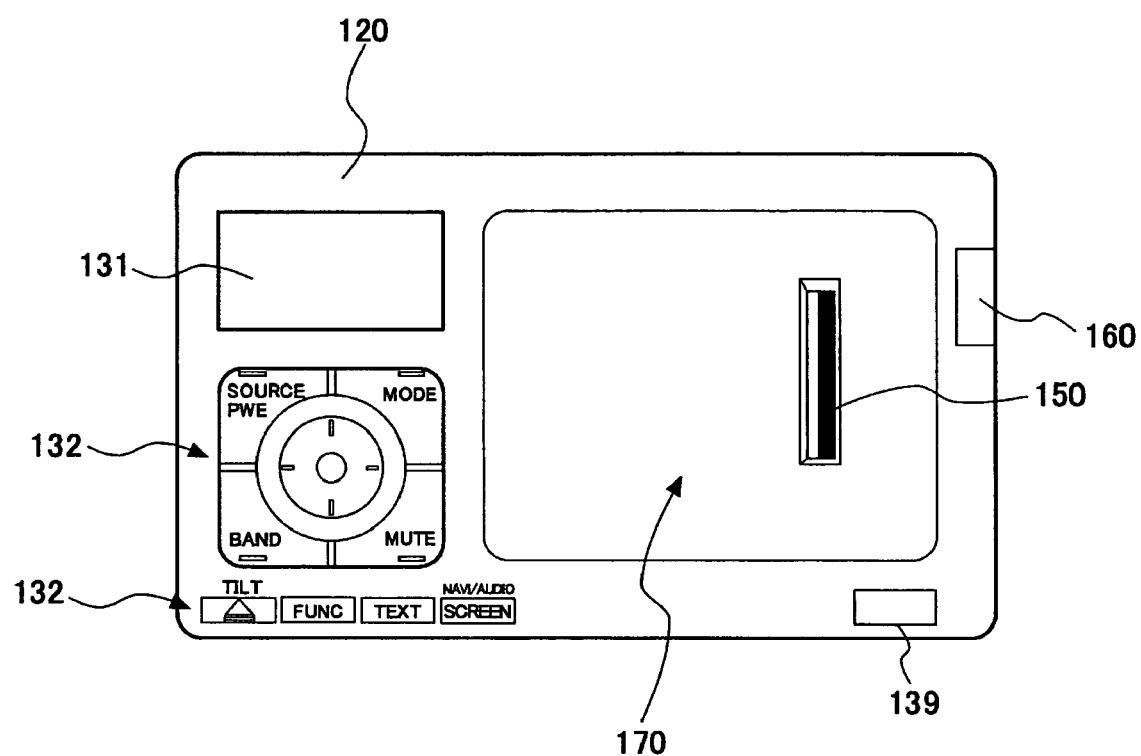
FIG. 2 is a schematic view of a portable apparatus taken out of an in-vehicle apparatus.

FIG. 2 illustrates the portable apparatus 10 taken out of the in-vehicle apparatus 100 (the front face portion 120). There is provided a detaching-attaching portion 170 in which a recess portion is defined for attaching the portable apparatus 10, at the front face portion 120 of the in-vehicle apparatus 100. The detaching-attaching portion 170 is provided with: a first connector 150 for electrically coupling the in-vehicle apparatus 100 and the portable apparatus 10; and a lock mechanism (not illustrated) for securing the portable apparatus 10 to the front face portion 120. When a detach button 160 (detach operating portion) provided at the front face portion 120 is operated, a lock mechanism, not illustrated, is unlocked and the portable apparatus 10 is detachable from the in-vehicle apparatus 100.

Figure 3:
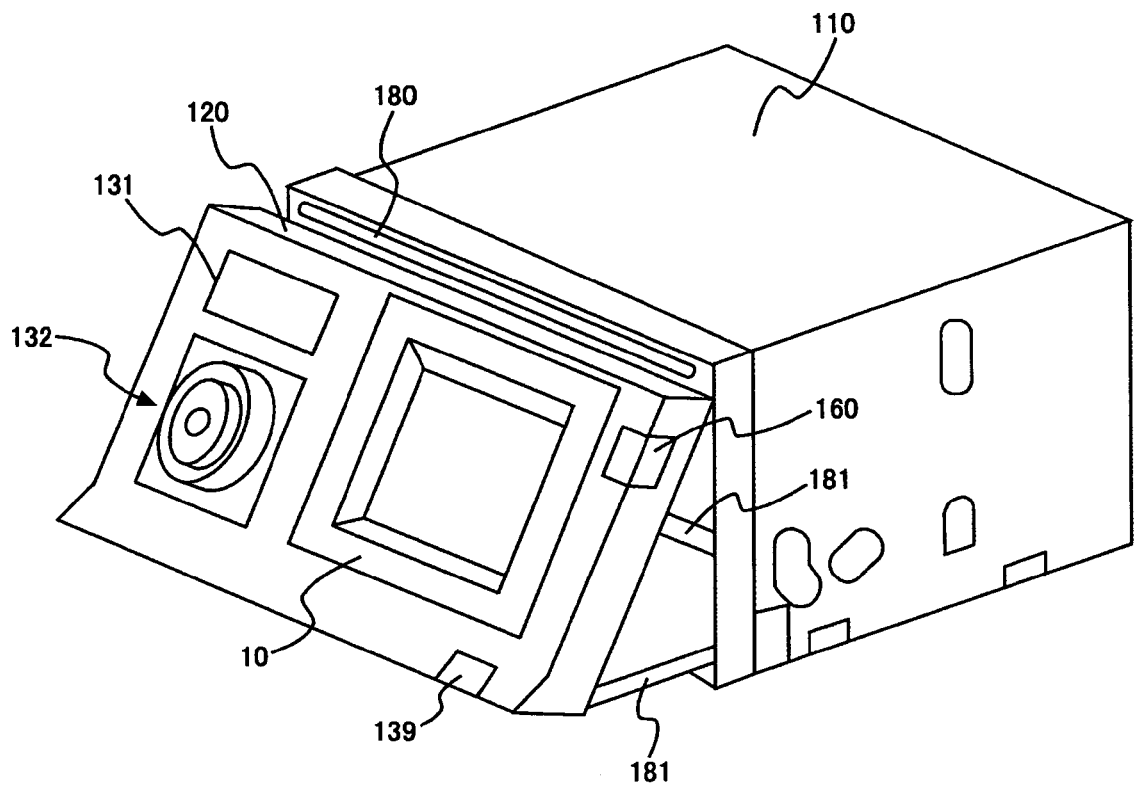
FIG. 3 is a schematic view illustrating a state of tilting a front face portion against the main body of the in-vehicle apparatus to expose a CD insertion/ejection slot.

FIG. 3 illustrates a state of tilting the front face portion 120 against the in-vehicle apparatus main body 110 to expose a CD insertion/ejection slot 180. By driving a slider 181 illustrated in FIG. 3 with a drive mechanism, not illustrated, the front face portion 120 can be tilted (displaced) against the in-vehicle apparatus main body 110. By tilting operation, the CD insertion/ejection slot 180 provided in the in-vehicle apparatus main body 110 is exposed, so a CD can be inserted or ejected. There is provided an operation button (a tilt/eject button 132a illustrated in FIG. 6), at the front face portion 120 of the in-vehicle apparatus, and a tilt angle can be set according to the operation of the button.

Figure 4:
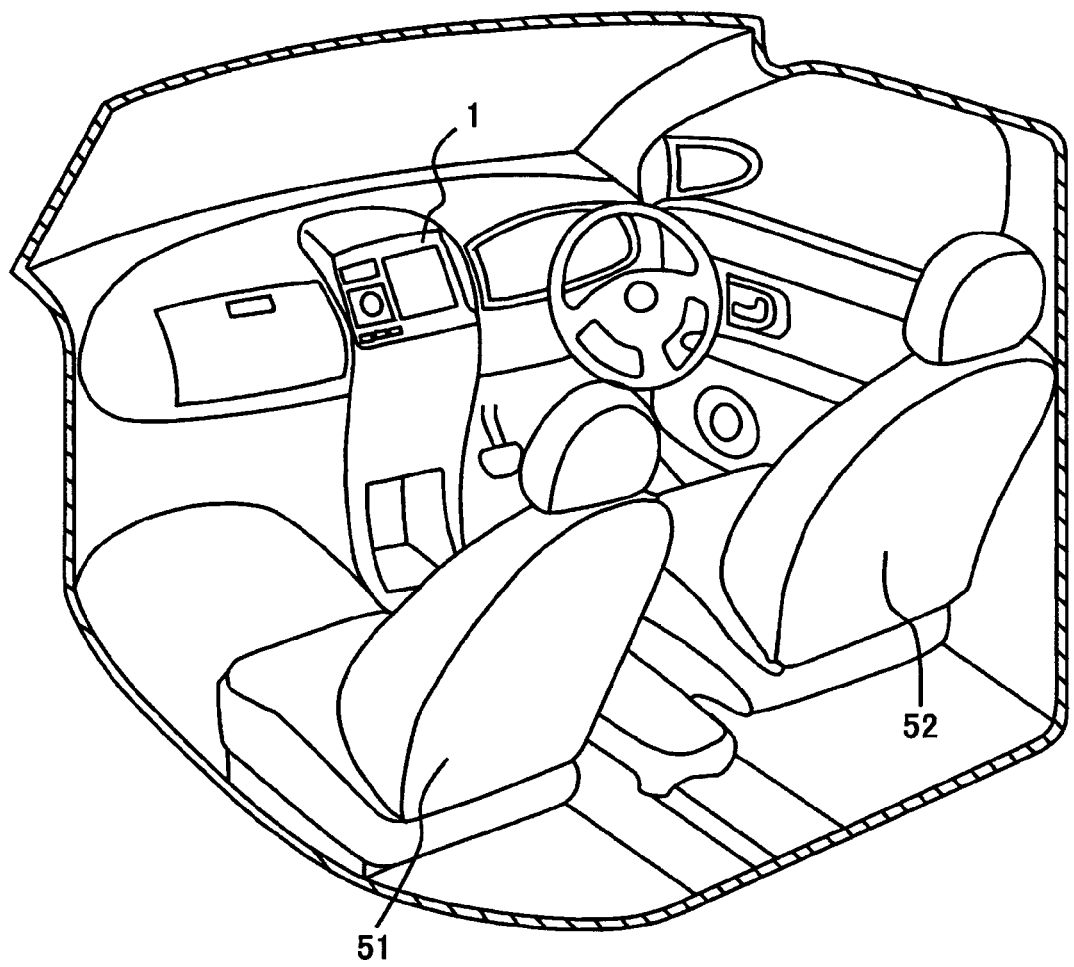
FIG. 4 is a schematic view illustrating an example of mounting the in-vehicle system in a vehicle.

FIG. 4 illustrates an example of mounting the in-vehicle system 1 in a vehicle. The in-vehicle system 1 is disposed in a dashboard portion substantially in the middle of a driver's seat 52, and a front-passenger's seat 51, as illustrated in FIG. 4, for example. Here, a GPS antenna, not illustrated, of a GPS information receiver 133 described later is located on the dashboard or attached at an inner side of a front glass.

Figure 5:
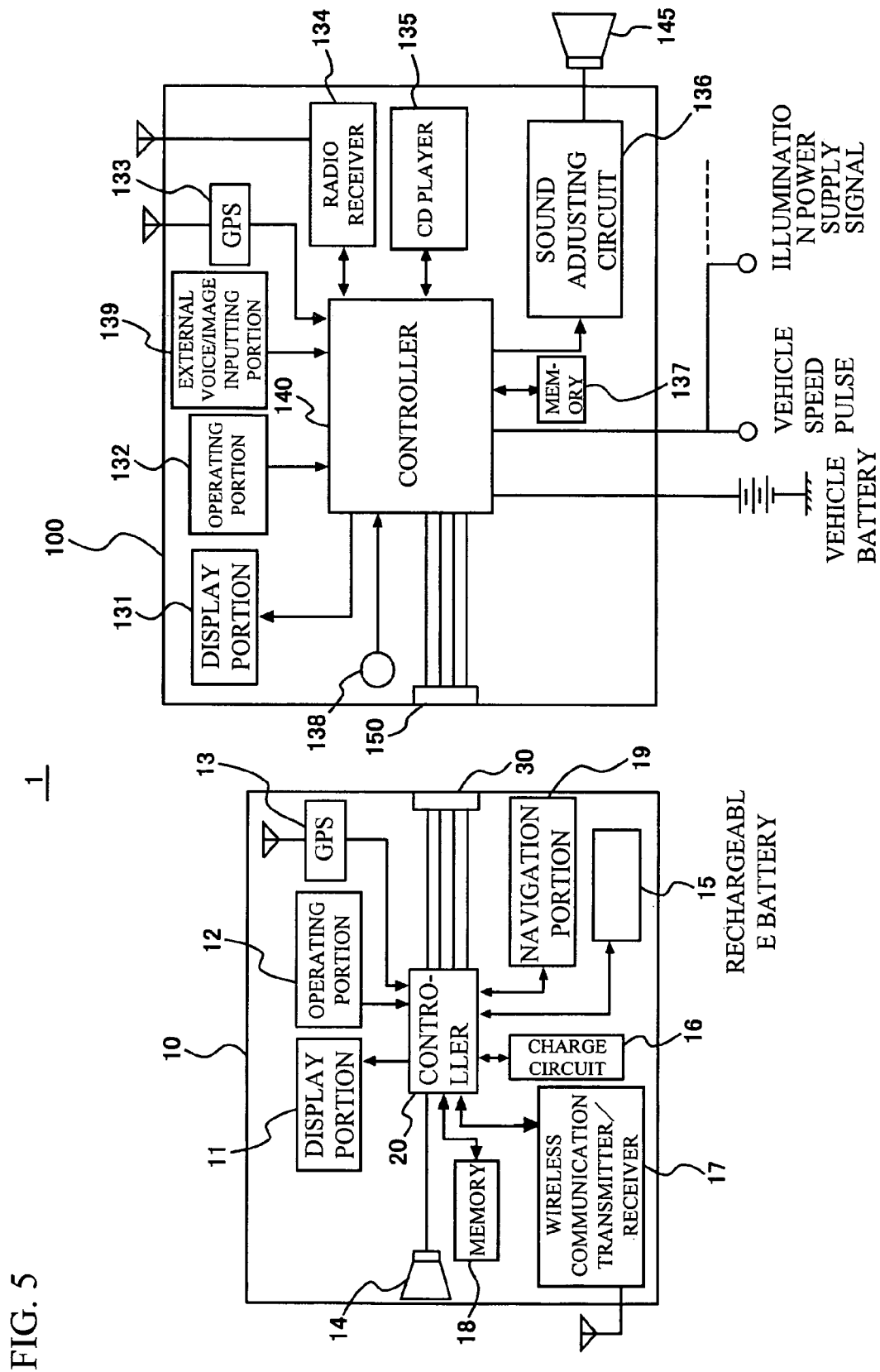
FIG. 5 is a block diagram illustrating a schematic configuration of the in-vehicle system.

FIG. 5 is a block diagram illustrating a schematic configuration of the in-vehicle system 1. The in-vehicle apparatus 100 and the portable apparatus 10 are electrically connected by connectors. The first connector 150 is provided at the in-vehicle apparatus 100 side, and a second connector 30 is provided at the portable apparatus 10. By connecting the first connector 150 and the second connector 30, various signals are sent and received between the in-vehicle apparatus 100 and the portable apparatus 10 to function as the in-vehicle system 1. The first connector 150 and the second connector 30 are respectively provided with power supply terminals for supplying power to the portable apparatus 10 from the battery of the vehicle. When the portable apparatus 10 is connected to the in-vehicle apparatus 100 and the power is supplied to the in-vehicle apparatus 100, the power is also supplied to the portable apparatus 10 via the power supply terminals. Herein, it is also possible that an antenna, not illustrated, that receives the air of the digital TV is provided in the in-vehicle apparatus 100, and the portable apparatus 10 receives the air from the antenna via the first connector 150 and the second connector 30 and displays digital TV broadcasting.

The in-vehicle apparatus 100 is provided with: the display portion 131; the operating portion 132; the GPS information receiver 133; a radio receiver 134; a CD player 135; a sound adjusting circuit 136; a memory 137; a microphone 138; an external voice/image inputting portion 139; a controller 140; and the first connector 150. The in-vehicle apparatus 100 is activated by supplying the power from the battery of the vehicle, when the engine key is positioned at ACC or ON.

Figure 6:
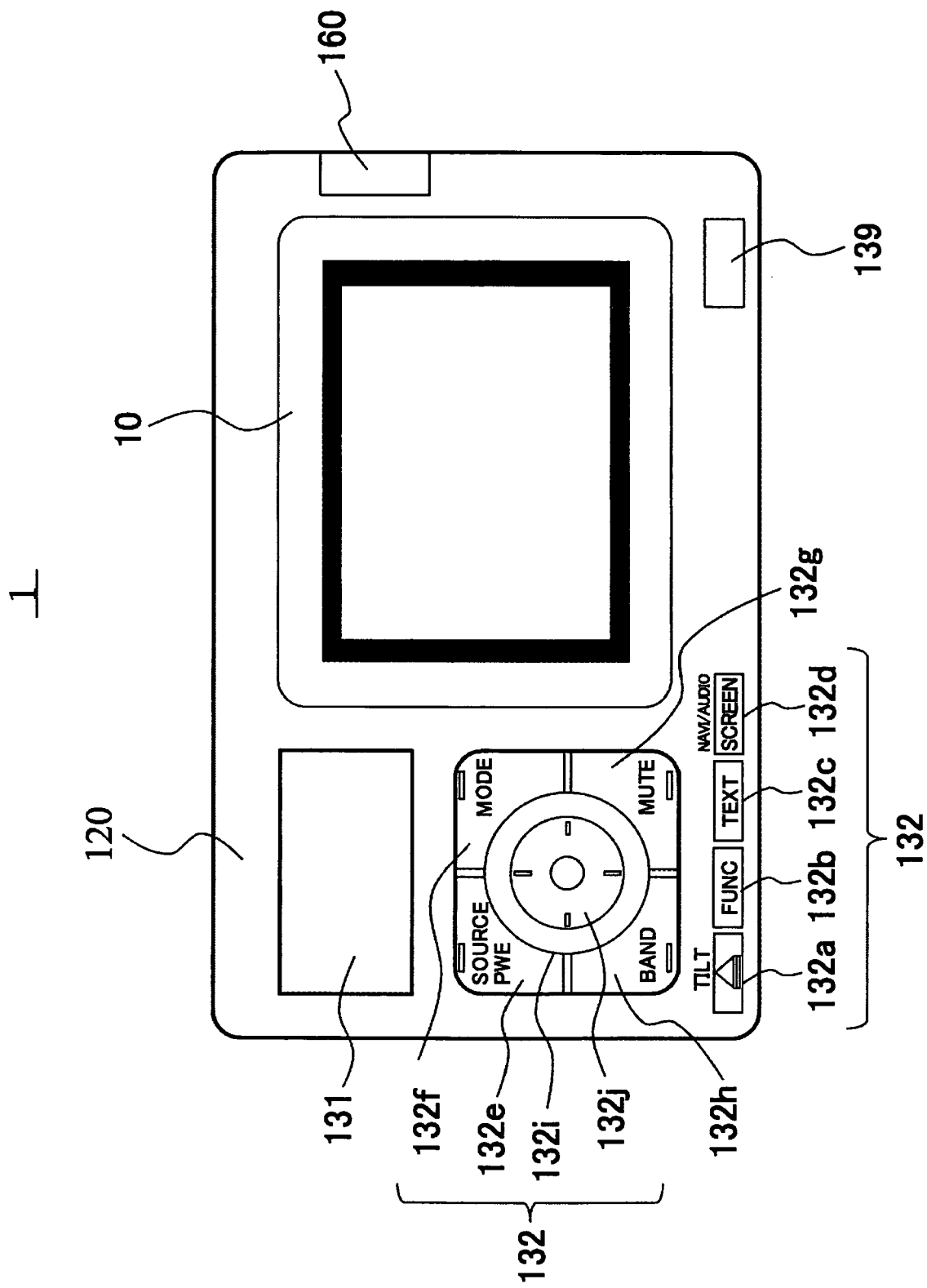
FIG. 6 is a front face view of the main portion.

Hereinafter, the function of each part will be described in detail. The display portion 131 is provided with a liquid crystal panel and a backlight, and displays a frequency of the received broadcasting, a track number of music being played, a music name being played, and the like, according to the 13-segment display. The operating portion 132 is provided for selectively changing the operation mode of the in-vehicle apparatus 100, and for operating in various modes that have been changed. The operating portion 132 is provided with a group of buttons including: the tilt/eject button 132a; a function (represented as FUNC hereinafter)/AF button 132b; a TEXT button 132c; a SCREEN button 132d; a SOURCE/PWR button 132e; a MODE button 132f; a MUTE button 132g; a BAND change button 132h; a rotary button 132i; a cross key/enter key button 132j, as illustrated in FIG. 6.

Herein, a description will be given of the control by operations of a group of buttons. Firstly, the description will be given of switching the display between the portable apparatus 10 and the in-vehicle apparatus 100 by the operation of the SOURCE/PWR button 132e. The in-vehicle apparatus 100 turns on when the SOURCE/POWER button 132e of the in-vehicle apparatus 100 is pushed. When the SOURCE/POWER button 132e is pushed for a short period of time while the portable apparatus 10 is on, the source is changed to the CD playing or radio broadcasting. At this time, the information on the selected source is displayed on the display portion 131 of the in-vehicle apparatus 100, and the navigation image is displayed on a display portion 11 of the portable apparatus 10, without relation to the source. Next, when the SCREEN button 132d is pushed, the navigation image displayed on the display portion 11 of the portable apparatus 10 can be changed to an image corresponding to the source selected at the in-vehicle apparatus 100.

FIG. 7A illustrates a state where the portable apparatus 10 is attached to the in-vehicle apparatus 100 while the CD is being played and a navigation image is being displayed on the portable apparatus 10. When the SOURCE/POWER button 132e is pushed in the state of FIG. 7A and the source is changed from the CD playing to the radio broadcasting, the information on the radio source is displayed on the display portion 131. Also, the navigation image remains being displayed on the display portion 11 of the portable apparatus 10. Then, when a user pushes the SCREEN button 132d, the image corresponding to the source being processed by the in-vehicle apparatus 100 is displayed on the display portion 11 of the portable apparatus 10, as illustrated in FIG. 7C (radio image is displayed in FIG. 7C). A touch panel, described later, is provided in the display portion 11 of the portable apparatus 10. A user is capable of operating the source currently being processed, by selecting the operation buttons displayed on the display portion 11.

In addition, when the SCREEN button 132d is pushed with the radio screen being displayed on the display portion 11, it is possible to return to the navigation image from the radio image, as illustrated in FIG. 7D. When the portable apparatus 10 is detached from the in-vehicle apparatus 100, the operation of the SCREEN button 132d is invalid. Furthermore, when a USB (Universal Serial Bus) or the like is connected to the external voice/image inputting portion 139 with the portable apparatus 10 detached from the in-vehicle apparatus 100, it is possible to prevent the change to the USB source, even if the SOURCE/POWER button 132e is pushed.

Next, a description will be given of a tilt behavior of the front face portion 120 according to the operation of the tilt/eject button 132a. When the tilt/eject button 132a is operated in the first mode (e.g. pushed for a short period of time), the front face portion 120 is tilted at the angle at which the CD insertion/ejection slot 180 is exposed (e.g. 60°), and when it is operated in the second mode (e.g. pushed for a long period of time), the front face portion 120 tilts by a predetermined angle (e.g. 5°).

Referring back to FIG. 5, the GPS information receiver 133 includes a GPS antenna and a tuner, and receives GPS signals from a satellite. The GPS signal received by the GPS information receiver 133 is output through the controller 140, the first connector 150, the second connector 30, and a controller 20, to a navigation portion 19 of the portable apparatus 10, and then the position of the vehicle in which the in-vehicle apparatus 100 having the portable apparatus 10 therein is determined based on the GPS signal. Here, the GPS signal received by the GPS information receiver 133 may be output to the navigation portion of the portable apparatus 10 through the controller 20, instead of through the controller 140. Alternatively, the GPS information receiver 133 may be composed of the GPS antenna only, so that the GPS signal received by the GPS antenna may be output to the tuner of a GPS information receiver 13, described later, without through the controller 140 or the controller 20. Further alternatively, the GPS signal may be output through the controller 20 to the tuner of the GPS information receiver 13 without through the controller 140. Various changes may be made as necessary.

The radio receiver 134 has an antenna and a tuner, receives broadcast waves such as AM broadcasting, FM broadcasting, and sound multiplex broadcasting, outputs stereo audio signals, receives and demodulates multiplex data, and outputs the demodulated signal to the controller 140. The CD player 135 reproduces the data stored in the CD, and outputs the reproduced signal to the controller 140. Herein, the demodulated signal output from the radio receiver 134 may be output to the sound adjusting circuit 136, described later, without through the controller 140.

The sound adjusting circuit 136 implements signal processing such as volume control or tone control on the sound signal received or demodulated by the radio receiver 134 or the sound signal reproduced by the CD player 135, and then outputs the processed signal to a speaker 145. The memory 137 may be composed of a RAM (Random Access Memory) from which data is readable and into which data is writable, and temporarily stores information necessary for control (for example, tables illustrated in FIG. 11A and FIG. 11B, and information about the present tilt angle of the front face portion 120). The microphone 138 is provided for hands-free communication, and takes in user's voices in the vehicle. The external voice/image inputting portion 139 (attaching portion) is provided with a connection terminal with an external device such as a USB memory, portable audio device, or the like so that an audio signal or data from the external device may be input. The external voice/image inputting portion 139 then sends the signal or data to the controller 140, and outputs the control signal from the controller 140, the audio signal, data, or the like to the external device connected.

The controller 140 controls the radio receiver 134, the CD player 135, and the sound adjusting circuit 136, according to the operation by means of the operating portion 132. Also, the controller 140 outputs various signals through the first connector 150 to the portable apparatus 10, and controls the in-vehicle apparatus 100 on the basis of the various signals input from the portable apparatus 10. For example, the controller 140 outputs the GPS signal received by the GPS information receiver 133 or the audio signal input through the microphone 138, to the portable apparatus 10 by way of the first connector 150. Here, the audio signal input through the microphone 138 may be output to the portable apparatus 10 by way of the first connector 150, without through the controller 140. In addition, the voice on communication over a mobile phone connected to the portable apparatus 10 is input through the first connector 150 into the controller 140, and is then output through the sound adjusting circuit 136 to the speaker 145. Furthermore, the controller 140 acquires an operation signal corresponding to a menu image of various modes displayed on the display portion 11 of the portable apparatus 10, from the controller 20 of the portable apparatus 10, and then controls the radio receiver 134 and the CD player 135.

Also, the power is supplied to the controller 140 from the battery mounted in the vehicle. When the portable apparatus 10 is connected, the controller 140 outputs the power supplied from the battery to the portable apparatus 10. Herein, a vehicle speed pulse and an illumination power supply signal are input into the controller 140 from a vehicle. The controller 140 transfers such input vehicle speed pulse to the controller 20 of the portable apparatus 10. Meanwhile, the vehicle speed pulse may be configured not to be input into the in-vehicle apparatus 100.

Next, a description will be given of the portable apparatus 10. The portable apparatus 10 is provided with: the display portion 11; an operating portion 12; the GPS information receiver 13; a speaker 14; a rechargeable battery 15; a charge circuit 16; a wireless communication transmitter/receiver 17; a memory 18; the navigation portion 19; the controller 20; and the second connector 30.

Hereinafter, functions of the components will be described in detail. The display portion 11 is provided with a liquid crystal panel and a backlight, and is capable of displaying map information generated by the navigation portion 19 and guiding path information to a destination, the received broadcasting frequency transferred from the in-vehicle apparatus 100, a music track number played, music name played, and the like. The display portions 11 and 131 may employ a flat panel display other than a liquid crystal panel. Examples are organic light emitting display, plasma display panel, cold-cathode flat panel display, or the like.

The operating portion 12 includes a power button 55 (see FIG. 10A) to turn on or off the power of the portable apparatus 10. The touch panel is, for example, disposed on the display screen of the display portion 11. When the touch panel is touched by a finger or a dedicated pen, the touched position is detected to determine whether or not there is an input operation. The power button 55 will be described later.

The GPS information receiver 13 includes an antenna and a tuner, and receives the GPS signal from a satellite. Such received GPS signal is output to the navigation portion 19, and the vehicle location is detected based on the GPS signal.

Meanwhile, the in-vehicle apparatus 100 is also provided with the GPS information receiver 133. However, when the portable apparatus 10 is attached to the in-vehicle apparatus 100, the location of the vehicle in which the in-vehicle apparatus 100 having the portable apparatus 10 therein is mounted is specified by use of the GPS signal (and the vehicle speed pulse) received by the GPS information receiver 133. When the portable apparatus 10 is used alone, the location thereof is specified by use of the GPS signal received by the GPS information receiver 13.

The speaker 14 is provided for outputting the audio information of the navigation portion 19, and outputs the audio information only when the portable apparatus 10 is detached from the in-vehicle apparatus 100, namely, used alone separately.

The rechargeable battery 15 supplies power to each portion of the portable apparatus 10. When the portable apparatus 10 is attached to the in-vehicle apparatus 100, the power is supplied through the power supply terminals of the second connector 30 from the battery of the vehicle and the rechargeable battery 15 is charged by the charge circuit 16. Also, the charge circuit 16 is supplied with the power from the connection terminal through a USB slot (see FIG. 8A), and the rechargeable battery 15 can be charged.

The wireless communication transmitter/receiver 17 sends and receives the voice on communication over a mobile phone, and acquires the information used for navigation over the mobile phone. For example, Bluetooth, which is a wireless transmission system at 2.4 GHz band, is used for the wireless communication transmitter/receiver 17.

The memory 18 may be a RAM from which data is readable and into which the data is writable, and temporarily stores the information read for each control.

The navigation portion 19 includes a map information storing portion in which the map information used for navigation acquired from an SD card or the USB memory, described later, is stored, determines current location information with GPS signal from the GPS information receiver 133 or the GPS information receiver 13, and creates an image for the navigation operation. The created map may be displayed on the display portion 11. When the in-vehicle apparatus 100 and the portable apparatus 10 are connected, the vehicle speed pulse is acquired from the vehicle so that the accuracy of the location detection of the vehicle in which the portable apparatus 10 is mounted in the in-vehicle apparatus 100 can be improved. Here, the map information may be retained in the portable apparatus 10.

The controller 20 controls each part of the portable apparatus 10. Also, the controller 20 outputs various signals to the in-vehicle apparatus 100 through the second connector 30, and controls the portable apparatus 10 based on the various signals input from the in-vehicle apparatus 100. For example, the controller 20 acquires the GPS signal received by the GPS information receiver 133 of the in-vehicle apparatus 100 and the vehicle speed pulse from the controller 140 of the in-vehicle apparatus 100, and outputs the GPS signal and the vehicle pulse to the navigation portion 19. Also, the controller 20 acquires the audio signal input by the microphone 138 of the in-vehicle apparatus 100 from the controller 140 of the in-vehicle apparatus 100, and controls the navigation portion 19 according to the audio signal. That is to say, the navigation portion 19 can be operated in a hands-free manner. The voice on communication over the mobile phone connected to the wireless communication transmitter/receiver 17 is output to an in-vehicle apparatus side through the second connector 30, and is caused to output from the speaker 145 of the in-vehicle apparatus 100. The operation signal on the menu screen or content screen displayed on the display portion 11 is output to the controller 140 of the in-vehicle apparatus 100 through the second connector 30. The controller 140 controls the radio receiver 134 or the CD player 135 according to the operation signal transmitted from the controller 20 of the portable apparatus 10.

Figure 8A:
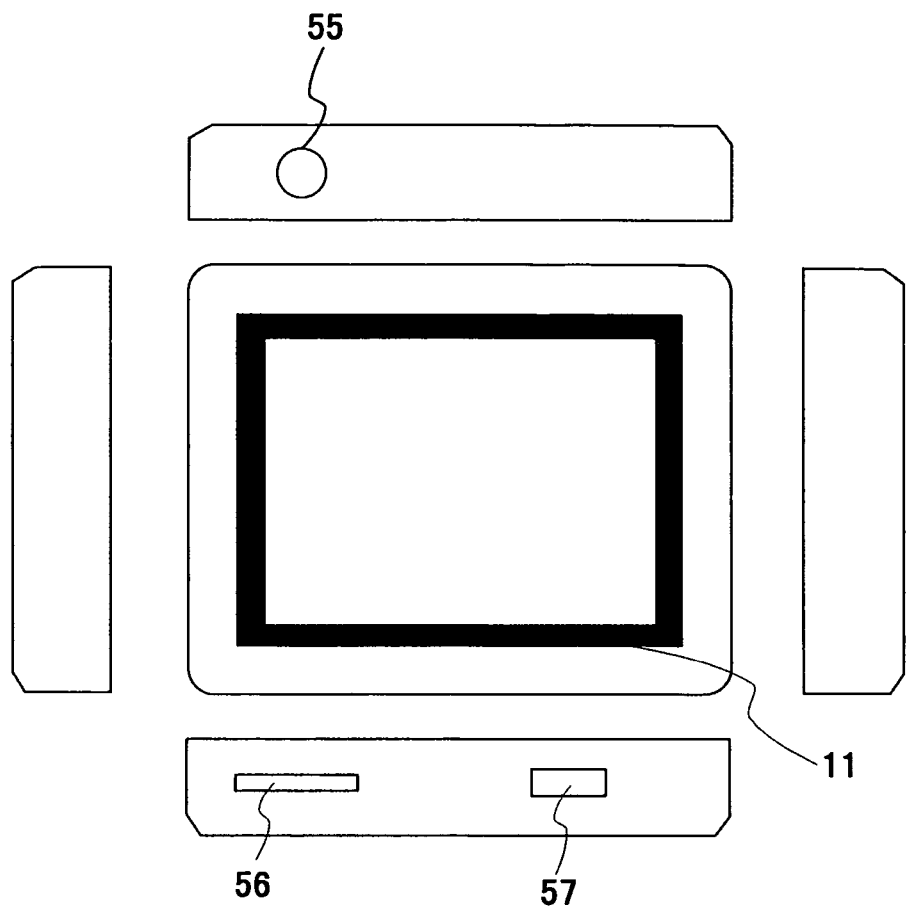
FIG. 8A is a front schematic view, a top schematic view, bottom schematic view, left side schematic view, and right side schematic view of the portable apparatus.
Figure 8B:
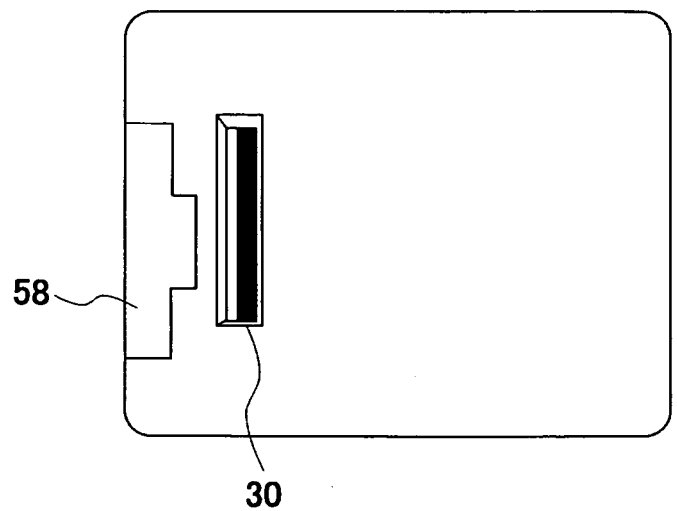
FIG. 8B is a back schematic view of the portable apparatus.

FIG. 8A illustrates a front view, top view, bottom view, left-side view, and right-side view of the portable apparatus 10. FIG. 8B is a back view of the portable apparatus 10. The top face of the portable apparatus 10 is provided with the power button 55 for turning on or off the power of the portable apparatus. The bottom face of the portable apparatus 10 is provided with: an SD (Secure Digital) memory card slot 56; and a USB slot 57. By inserting the SD card or the USB memory, in which the map information is stored, into the slots, the controller 20 reads out the map information from the SD card or the USB memory and outputs the map information to the navigation portion 19.

The power of the portable apparatus 10 is turned on or off on basis of control from the in-vehicle apparatus 100, when the portable apparatus is attached to the in-vehicle apparatus 100. Also, the power is operated on the basis of on or off operation of the power button 55, when the portable apparatus 10 is detached from the in-vehicle apparatus 100 and used alone separately.

Furthermore, on the back side of the portable apparatus 10, there are provided the second connector 30 for establishing electrical connection with the in-vehicle apparatus 100 and a latch portion 58 latched with a lock mechanism (not illustrated) provided at the in-vehicle apparatus 100 side.

Figure 9:
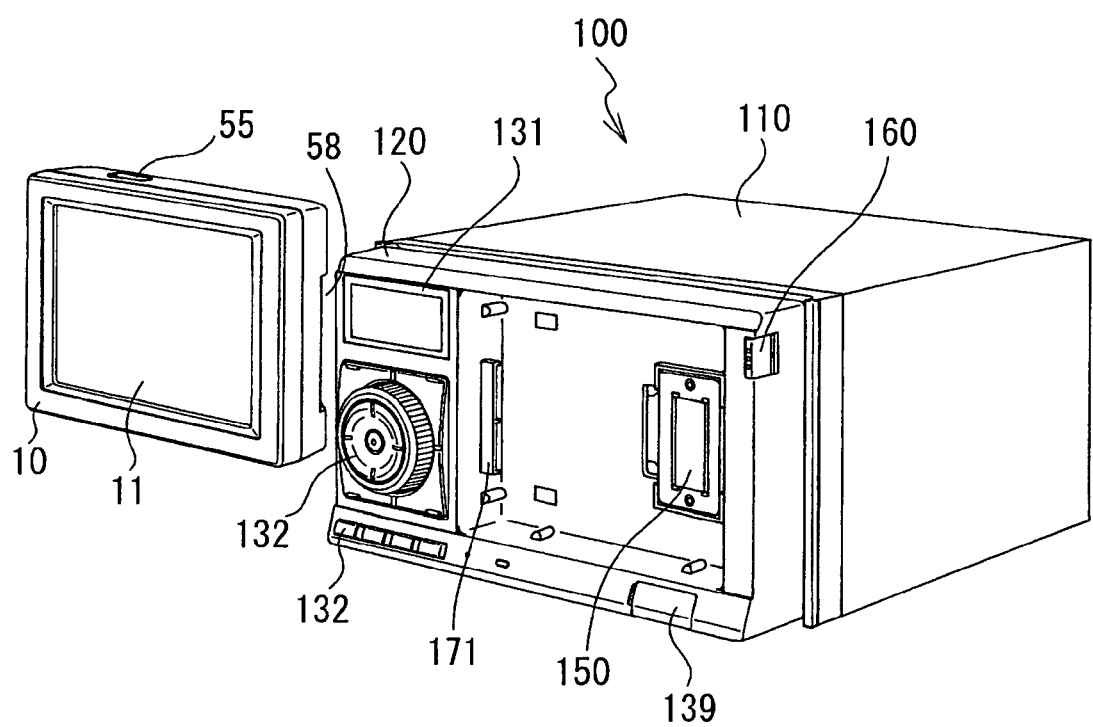
FIG. 9 is a diagram illustrating an exterior view of an in-vehicle system.

FIG. 9 is an actual exterior view equivalent to the schematic exterior view of the in-vehicle apparatus 100 and the portable apparatus 10 illustrated in FIG. 1A. The bottom face of the detaching-attaching portion 170 in which a recess portion is defined is provided with the first connector 150. The side of the operating portion 132 side is provided with an engagement projection portion 171. The latch portion 58 is provided on the side of the portable apparatus 10. The same components as those illustrated in FIG. 1B are denoted by the same reference numerals as those in FIG. 1B, and explanation of them is omitted here.

Figure 10:
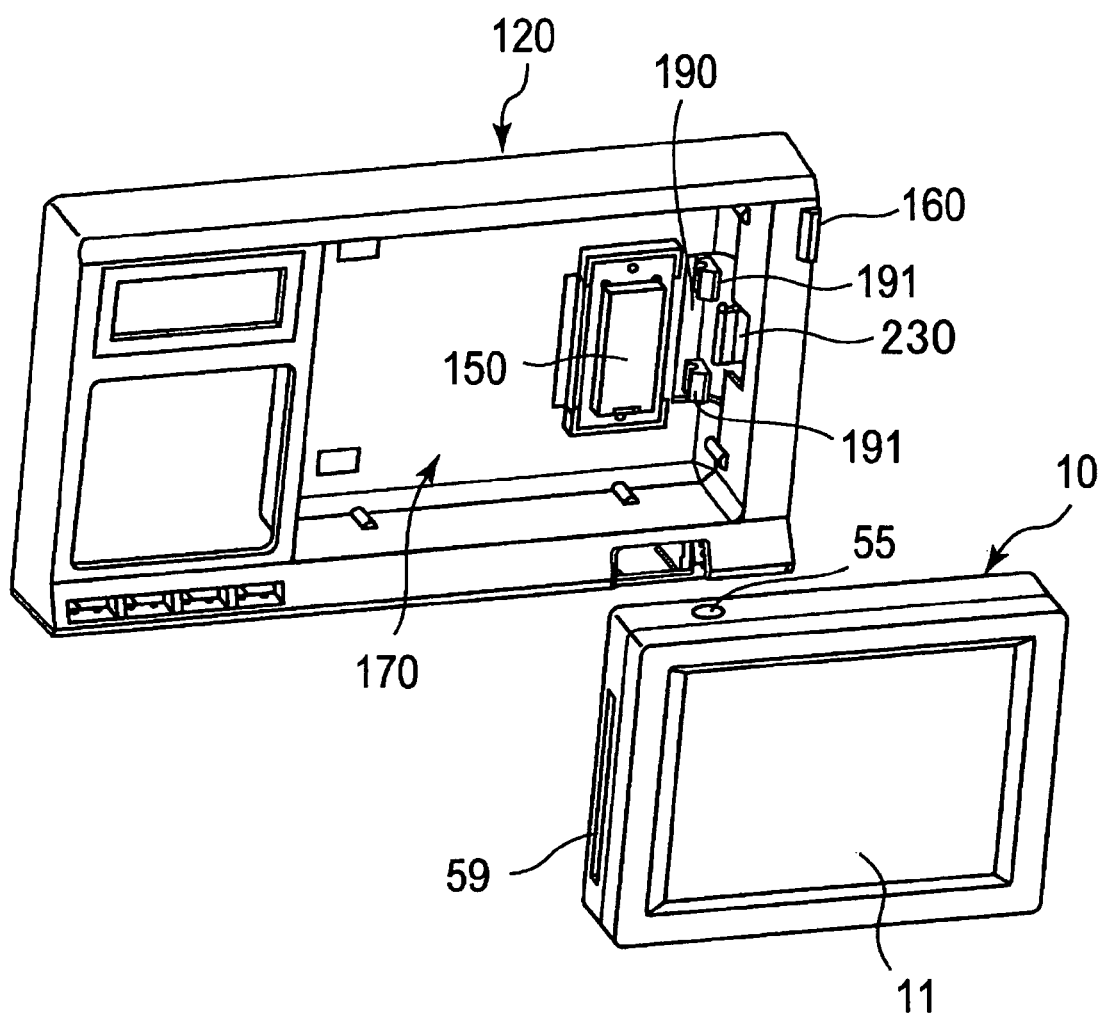
FIG. 10 is a perspective view illustrating a portable apparatus and a main portion.

FIG. 10 is a perspective view of the front face portion 120 of the in-vehicle apparatus 100 and the portable apparatus 10. The operating portion 132 and the display portion 131 are omitted. A lock mechanism 190 including an engagement nail portion 191 and a push-out member 230 are provided on the opposite side to the side on which the engagement projection portion 171 of the detaching-attaching portion 170 is provided. The lock mechanism 190 and the engagement projection portion 171 function as a first engagement portion to which the portable apparatus 10 or the electronic apparatus cover 200 is attached, by engaging with a third engagement portion (the latch portion 58 and an engagement recess portion 59, respectively) or a second engagement portion of the electronic apparatus cover (a latch portion 58a and an engagement recess portion 59a in FIG. 13C described later).

Figure 11A:
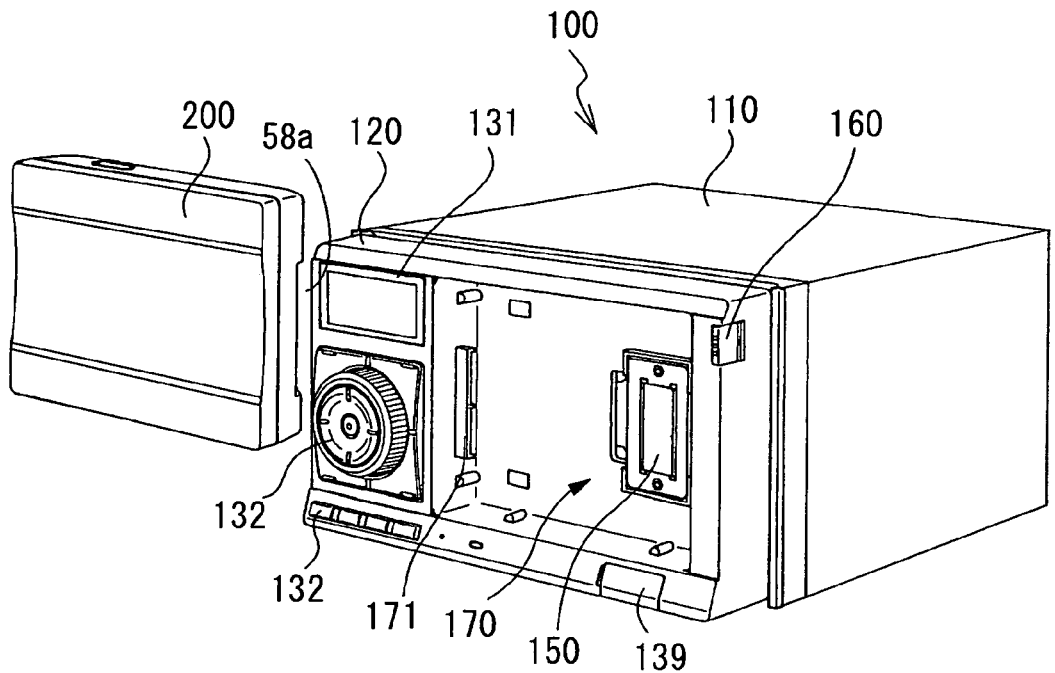
FIG. 11A and FIG. 11B are outline views illustrating the in-vehicle apparatus from which the portable apparatus is taken out and the electronic apparatus cover in accordance with the first embodiment.
Figure 11B:
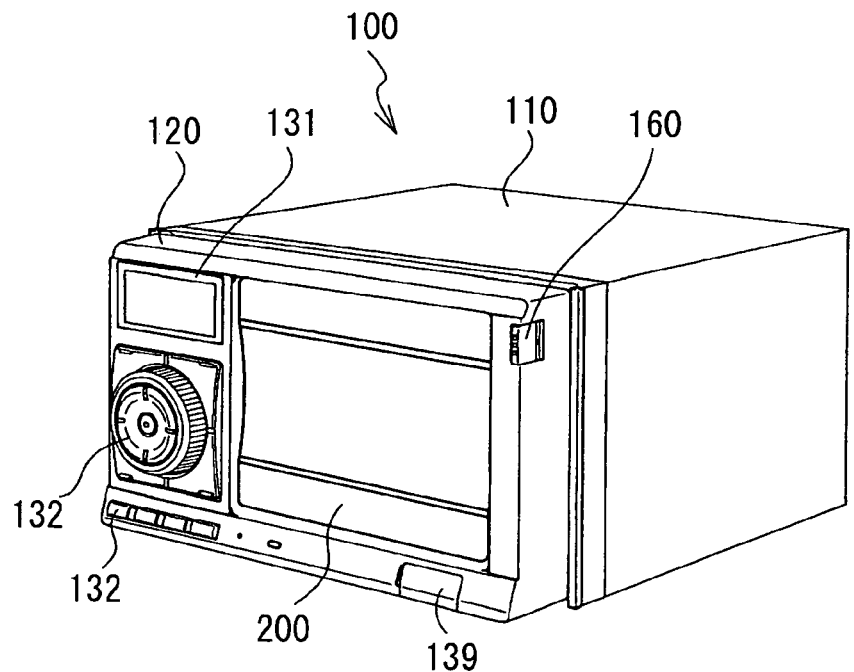

FIG. 11A is an exterior view illustrating the in-vehicle apparatus 100 with the portable apparatus 10 detached from the in-vehicle apparatus 100 and the electronic apparatus cover 200. The electronic apparatus cover 200 is composed of a synthetic resin composed of a polycarbonate and an ABS (Acrylonitrile Butadiene Styrene) resin, and can be attached to the detaching-attaching portion 170 in which the recess portion is defined, instead of the portable apparatus 10. Here, it is possible to form the electronic apparatus cover 200 with other insulating materials and metals. FIG. 11B is an exterior view with the electronic apparatus cover 200 attached to the detaching-attaching portion 170. The electronic apparatus cover 200 is approximately the same size as the portable apparatus 10, and is attached to the detaching-attaching portion 170 of the in-vehicle apparatus 100. As described in FIG. 14A through FIG. 14C, the method of attaching the electronic apparatus cover 200 is same as the method of attaching the portable apparatus 10.

Figure 12:
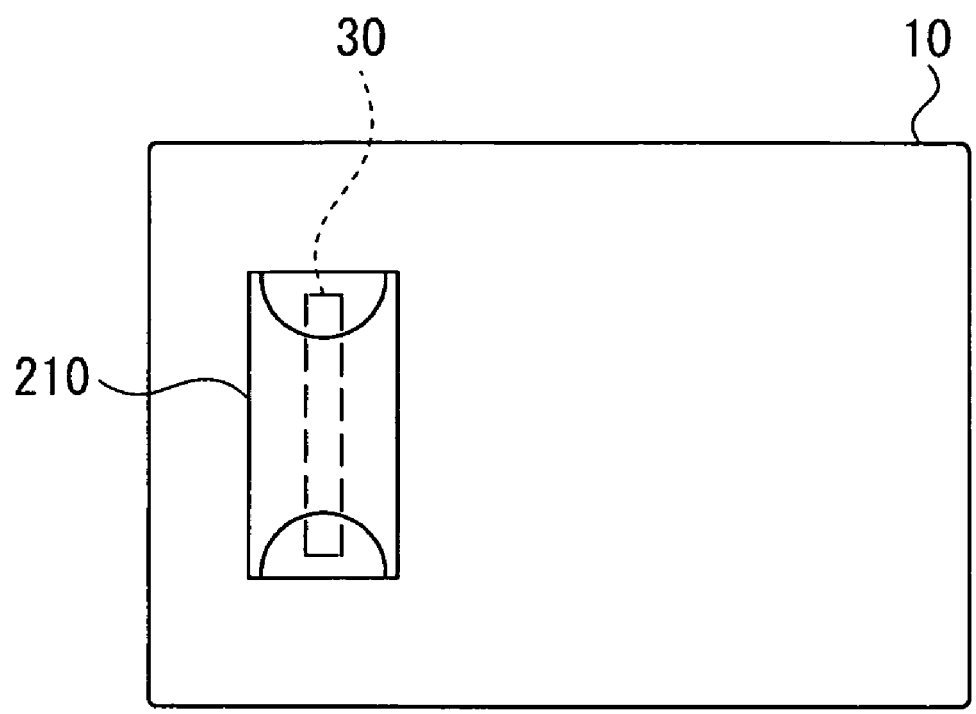
FIG. 12 is a back schematic view of the portable apparatus to which the electronic apparatus cover is attached.

FIG. 12 is a back view of the portable apparatus 10. As contrasted with FIG. 8B, a connector cover 210 is recessed into the second connector 30 provided on the back side of the potable apparatus 10. Here, the latch portion 58 is not illustrated.

Figure 13A:
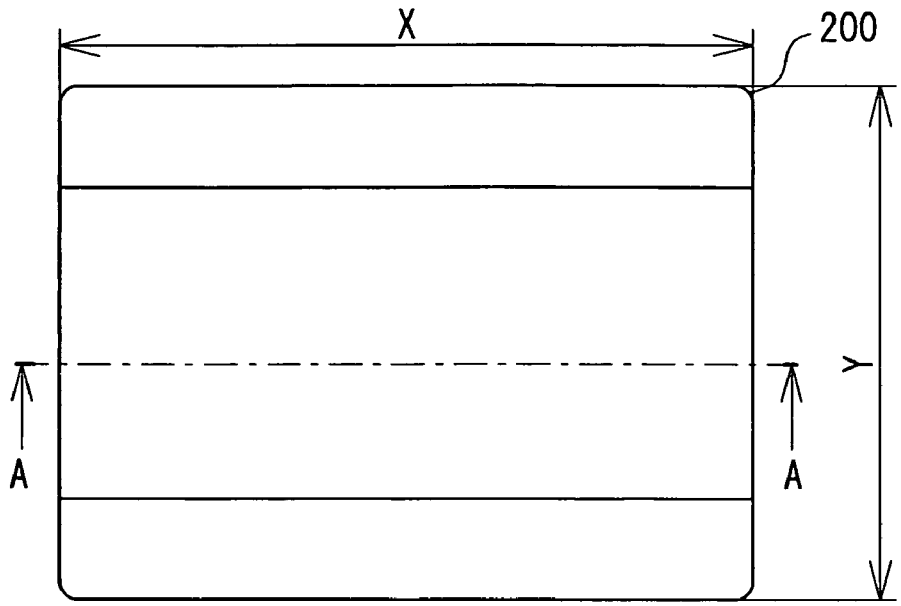
FIG. 13A is a front view of the electronic apparatus.
Figure 13B:
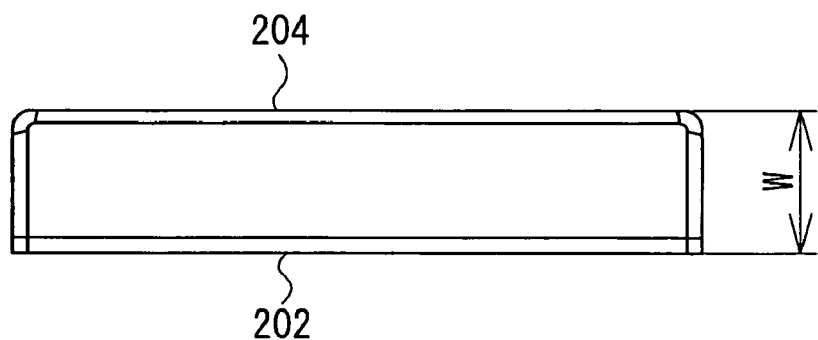
FIG. 13B is a top view.
Figure 13C:
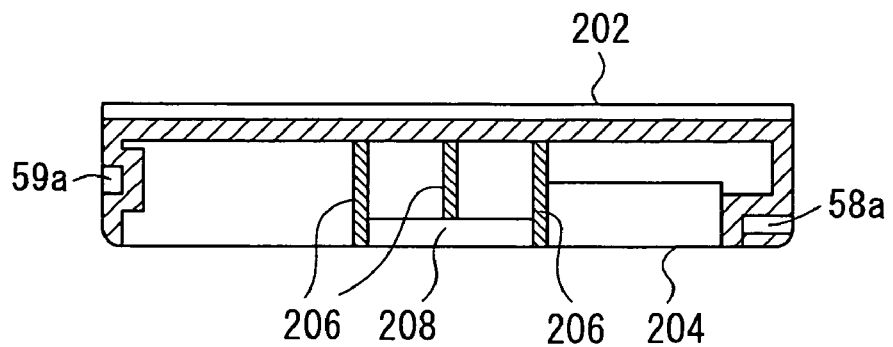
FIG. 13C is a sectional view taken from line A-A in FIG. 13A.

FIG. 13A, FIG. 13B, and FIG. 13C are a front view, top view, sectional view taken from line A-A of the electronic apparatus cover 200 respectively. Referring to FIG. 13A, the shape viewed from the front 202 of the electronic apparatus cover 200 is almost same as the shape viewed from the front of the detaching-attaching portion 170 of the in-vehicle apparatus 100. The sizes X and Y viewed from the front of the electronic apparatus cover 200 are a bit smaller than the sizes of the recess portion of the detaching-attaching portion 170. Accordingly, there are almost no clearances between the electronic apparatus cover 200 and the in-vehicle apparatus 100 with the electronic apparatus cover 200 attached to the recess portion of the detaching-attaching portion 170.

Referring to FIG. 13B, the width W of the electronic apparatus cover 200 is almost same as the width of the recess portion of the detaching-attaching portion 170 of the in-vehicle apparatus 100. Accordingly, the recess portion of the detaching-attaching portion 170 is almost occupied by the electronic apparatus cover 200 with the electronic apparatus cover 200 attached to the recess portion of the detaching-attaching portion 170. Here, it is preferable for the width W of the electronic apparatus cover 200 to be a bit less than the width of the recess portion of the detaching-attaching portion 170 not to project from the in-vehicle apparatus 100.

Referring to FIG. 13C, partition portions 206 for reinforcing strength are provided on the back side 204 of the electronic apparatus cover 200. Between the partition portions 206, a holding portion 208 that holds the connector cover 210 of the portable apparatus 10 is provided. In addition, the latch portion 58a is provided on the side of the electronic apparatus cover 200, and the engagement recess portion 59a is provided on the opposite side. The latch portion 58a and the engagement recess portion 59a function as a second engagement portion that engages with the lock mechanism 190 provided in the detaching-attaching portion 170 of the in-vehicle apparatus 100 and the engagement projection portion 171.

Figure 14A:
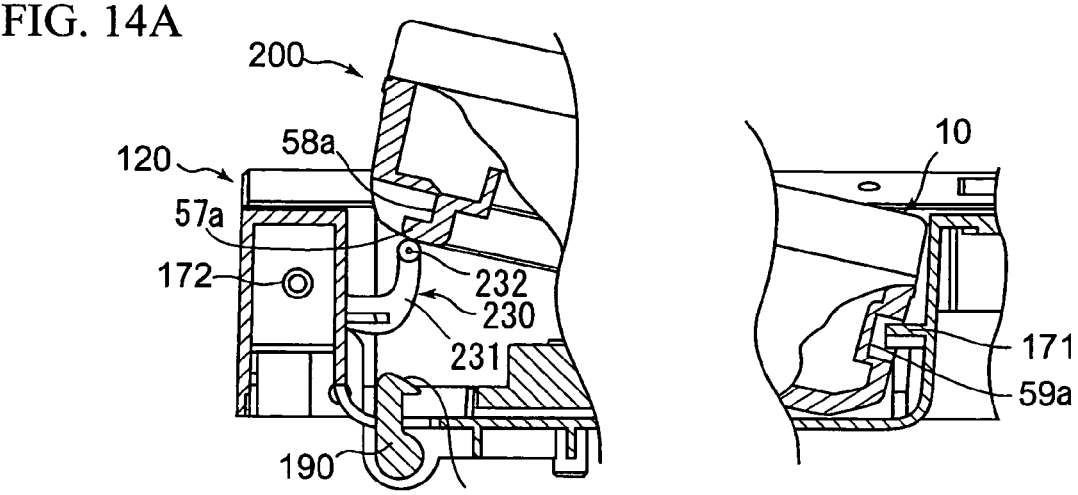
FIG. 14A thorough FIG. 14C are cutaway sectional views illustrating the method of attaching the electronic apparatus cover to the detaching-attaching portion.
Figure 14B:
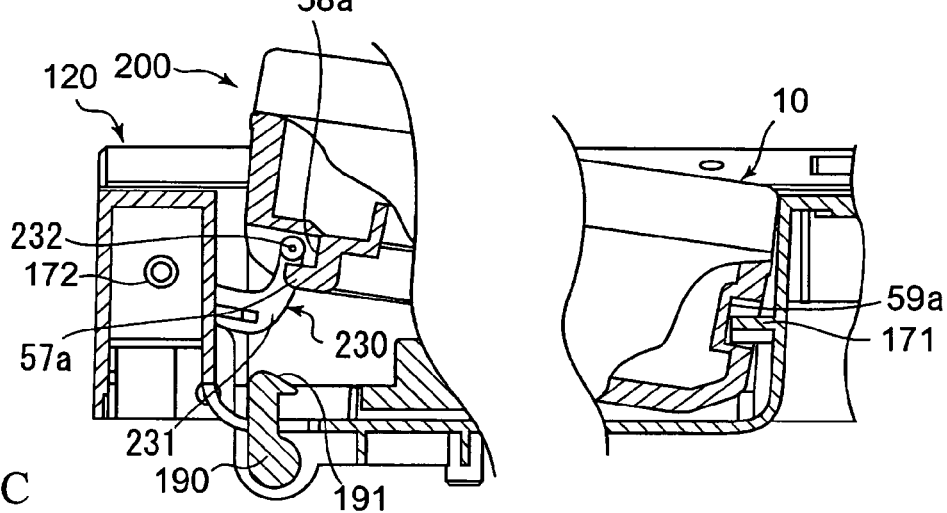
Figure 14C:
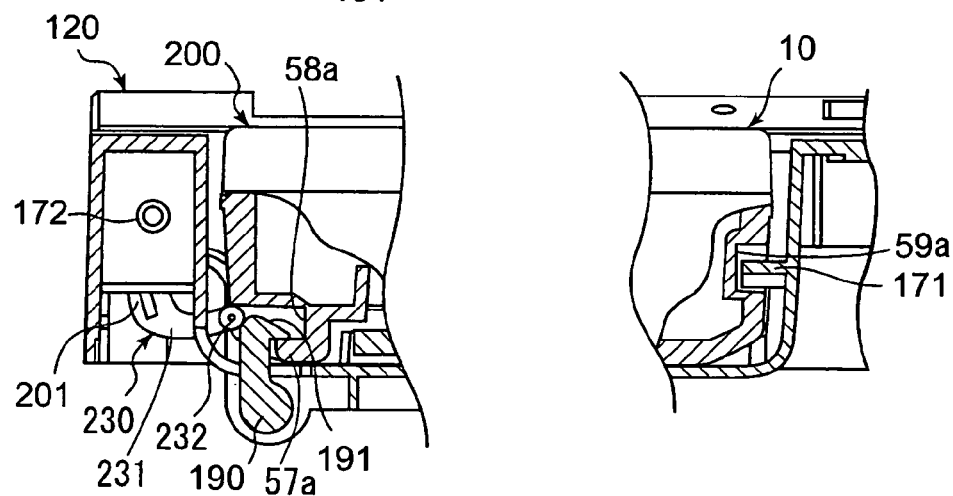

FIG. 14A through FIG. 14C are cutaway cross-sectional views illustrative of the method of attaching or detaching the electronic apparatus cover 200 and the in-vehicle-apparatus 100. Here, the method of attaching or detaching the portable apparatus 10 and the in-vehicle apparatus 100 is same as the method of attaching or detaching the electronic apparatus cover 200 and the in-vehicle apparatus 100, and the description will be omitted.

Referring to FIG. 14A, the side portion where the engagement recess portion 59a is defined firstly is inserted into the detaching-attaching portion 170 with the electronic apparatus cover 200 tilting toward the detaching-attaching portion 170, so that the engagement projection portion 171 defined at the side portion of the detaching-attaching portion 170 may be engaged with the engagement recess portion 59a defined at the side portion of the electronic apparatus cover 200.

Referring to FIG. 14B, when an opposite side to the side where the engagement recess portion 59a is defined (the side where the latch portion 58a is defined) is pushed with the engagement projection portion 171 and the engagement recess portion 59 engaged with each other, an arm portion 231 passes through a cutaway portion 57a, and the latch portion 58a and the push-out member 230 are in contact with each other. If a user releases his/her hands from the electronic apparatus cover 200 in this state, the weight of the electronic apparatus cover 200 causes the electronic apparatus cover 200 to move downward slightly (in a depth direction of the drawing), so an engagement pin 232 of the push-out member 230 is engaged with a inner face of the latch portion 58a. The push-out member 230 is biased around the axis 172 by the spring (not illustrated) in a counterclockwise direction in FIG. 14B.

Referring to FIG. 14C, when the electronic apparatus cover 200 is further pushed, the push-out member 230 is turned around the axis 172 by the latch portion 58a in a clockwise direction, and the latch portion 58a and the engagement nail portion 191 of the lock mechanism 190 are engaged. By the operation above, the electronic apparatus cover 200 is attached to the detaching-attaching portion 170.

Next, a description will be given of the detachment of the electronic apparatus cover 200 from the detaching-attaching portion 170. By pushing the detach button 160, the lock mechanism 190 turns around the axis 172 in a counterclockwise direction, and the latch portion 58a and the lock mechanism 190 are disengaged. Because the push-out member 230 biases the electronic apparatus cover 200 from the rear face to the front face of the electronic apparatus cover 200, the side in which the latch portion 58a is defined in the electronic apparatus cover 200 is ejected from the detaching-attaching portion 170. Hence, the push-out member 230 has a function of ejecting the electronic apparatus cover 200 attached in the detaching-attaching portion 170 from the detaching-attaching portion 170.

Figure 15:
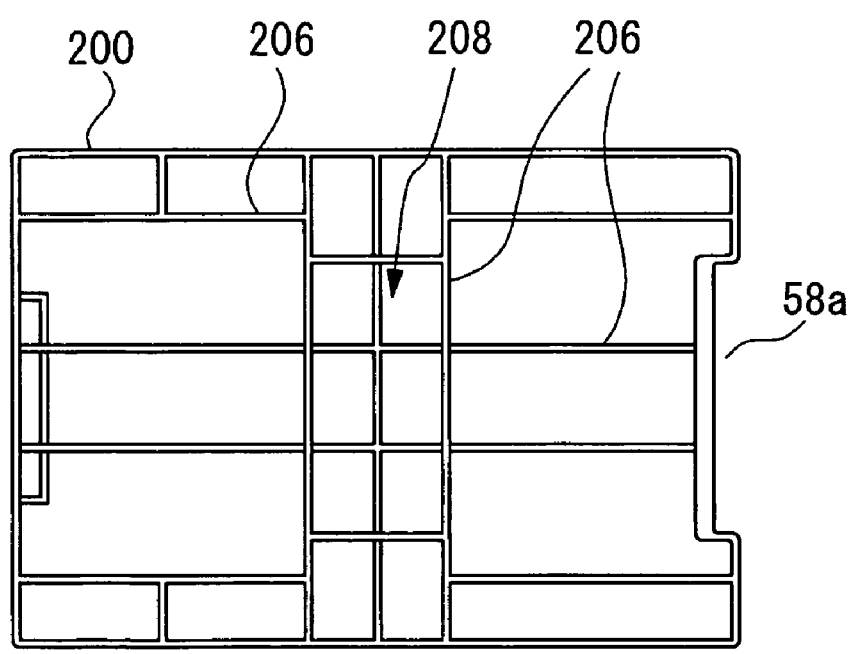
FIG. 15 is a back view of the electronic apparatus cover.

FIG. 15 is a back view of the electronic apparatus cover 200. The back face of the electronic apparatus cover 200 is provided with the partition portions 206 for reinforcing the strength of the electronic apparatus cover 200 in a rectangular pattern. The holding portion 208 is surrounded by the lattice-shaped partition portions 206, and is formed so that the partition portions 206 hold the connector cover 210.

Figure 16A:
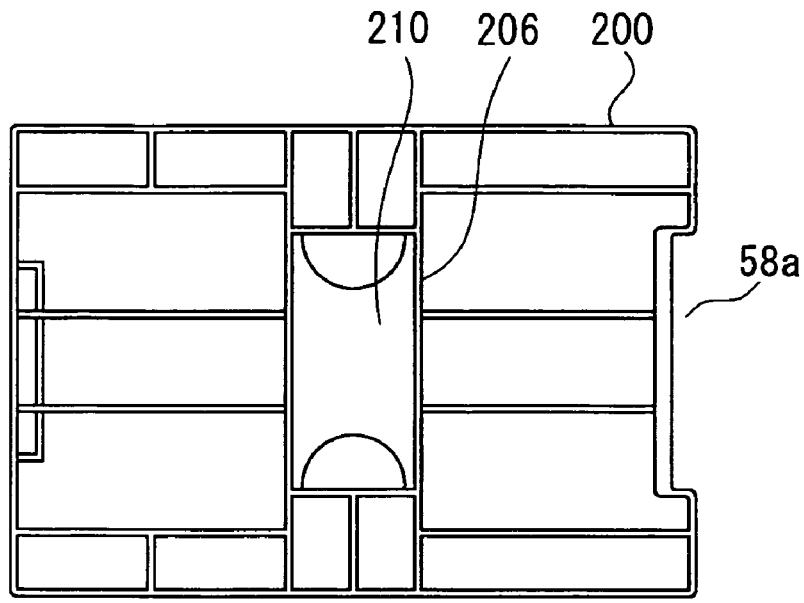
FIG. 16A is a back view of the electronic apparatus cover holding the connector cover.
Figure 16B:
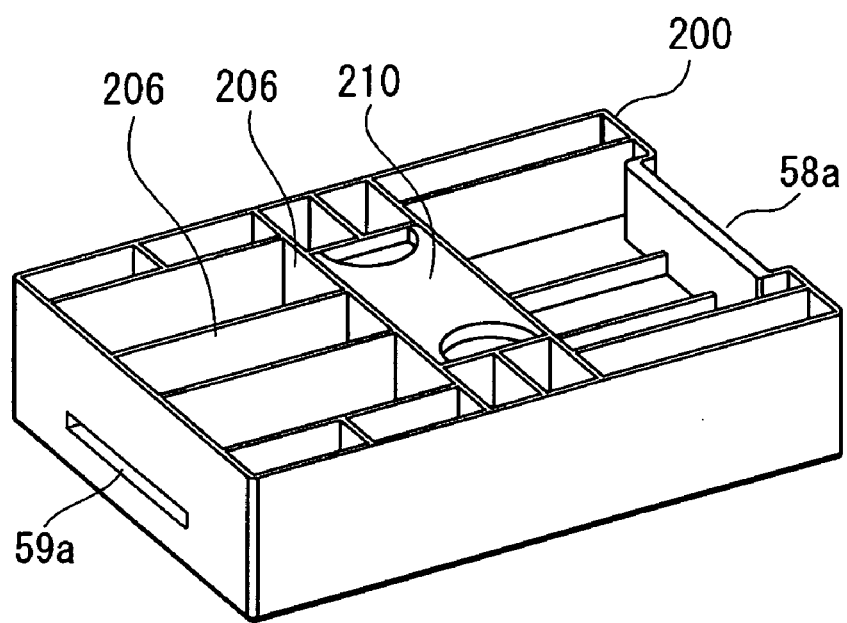
FIG. 16B is a perspective view.

FIG. 16A is a back view in the state that the electronic apparatus cover 200 holds the connector cover 210. FIG. 16B is a perspective view. Referring to FIG. 16A and FIG. 16B, it is possible to recess the connector cover 210 in the holding portion 208 of the electronic apparatus cover 200.

A description will be given of usage example of the electronic apparatus cover 200 and the connector cover 210 described above.

(1) First, push the detach button 160, and detach the portable apparatus 10 from the detaching-attaching portion 170 of the in-vehicle apparatus 100.

(2) Before attaching the electronic apparatus cover 200 to the in-vehicle apparatus 100, detach the connector cover 210 held by the holding portion 208 of the electronic apparatus cover 200, and recess the connector cover 210 to the second connector 30 of the portable apparatus 10.

(3) Attach the electronic apparatus cover 200 to the detaching-attaching portion 170 of the in-vehicle apparatus 100.

(4) As described in FIG. 14A through FIG. 14C, the method of attaching the electronic apparatus cover 200 is same as the method of attaching the portable apparatus 10.

(5) Accordingly, the electronic apparatus cover 200 protects the first connector 150, and the beauty of the in-vehicle apparatus 100 is also elevated. In addition, the connector cover 210 protects the second connector 30.

(6) When attaching the portable apparatus 10 to the in-vehicle apparatus 100 again, push the detach button 160 as described in (1), and detach the electronic apparatus cover 200 from the detaching-attaching portion 170 of the in-vehicle apparatus 100. Detach the connector cover 210 from the second connector 30 of the portable apparatus 10.

(7) Recess the connector cover 210 in the holding portion 208 of the electronic apparatus cover 200. Attach the portable apparatus 10 to the detaching-attaching portion 170 of the in-vehicle apparatus 100.

(8) As described above, it is easy to attach and detach the electronic apparatus cover 200, and it is possible to keep the electronic apparatus cover 200 and the connector cover 210 by the set.

As illustrated in FIG. 8B, the portable apparatus 10 (portable apparatus) includes the latch portion 58 and the engagement recess portion 59 (third engagement portion), and the second connector 30. As described in FIG. 9 and FIG. 10, the in-vehicle apparatus 100 (electronic apparatus) includes the detaching-attaching portion 170 in which the recess portion is defined, for attaching the portable apparatus 10, the first connector 150 provided within the recess portion of the detaching-attaching portion 170 to connect to the second connector 30 electrically, and the lock mechanism 190 and the engagement projection portion 171 (first engagement portion) to engage the latch portion 58 and the engagement recess portion 59. As with FIG. 14A through FIG. 14C, the portable apparatus 10 is attached to the in-vehicle apparatus 100 with the lock mechanism 190 and the engagement projection portion 171 engaged with the latch portion 58 and the engagement recess portion 59 respectively. The portable apparatus 10 is detached with the lock mechanism 190 and the engagement projection portion 171 unengaged with the latch portion 58 and the engagement recess portion 59. As illustrated in FIG. 11B, the electronic apparatus cover 200 in accordance with the first embodiment is attached to the detaching-attaching portion 170 of the in-vehicle apparatus 100 so as to cover the first connector 150. In addition, as illustrated in FIG. 14A through FIG. 14C, the electronic apparatus cover 200 includes the latch potion 58a and the engagement recess portion 59a. The electronic apparatus cover 200 is attached to the detaching-attaching portion 170 of the in-vehicle apparatus 100, so that the latch potion 58a and the engagement recess portion 59a engage with the lock mechanism 190 of the in-vehicle apparatus 100 and the engagement projection portion 171.

As described above, the electronic apparatus cover 200 in accordance with the first embodiment can be detached and attached with the same method as the method of detaching or attaching the portable apparatus 10 by means of the latch portion 58a. Therefore, detaching the electronic apparatus cover 200 becomes easy. Here, the third engagement portion (the latch portion 58 and the engagement recess portion 59) and the second engagement portion (the latch portion 58a and the engagement recess portion 59a) may be able to engage the first engagement portion (the lock mechanism 190 and the engagement projection portion 171) respectively. It is preferable that the third engagement portion (the latch portion 58 and the engagement recess portion 59) and the second engagement portion (the latch portion 58a and the engagement recess portion 59a) have equality in shape respectively. Each engagement portion (the first engagement portion, the third engagement portion, and the second engagement portion) is not limited to the shape described in the embodiment. In addition, although the description was given under the example that the each engagement portion is composed of two parts (for example, the first engagement portion is composed of two parts, the lock mechanism 190 and the engagement projection portion 171), each engagement portion may be composed of one part or more than three parts.

In addition, compared to protecting only the first connector 150, the exterior appearance becomes better, because it is also possible to cover the lock mechanism 190 and the push-out member 230 other than the first connector 150 for example, which are provided in the detaching-attaching portion 170.

Furthermore, although the electronic apparatus cover 200 may cover a part of the recess portion that is the detaching-attaching portion 170 of the in-vehicle apparatus 100, it is preferable to cover whole part of the recess portion that is the detaching-attaching portion 170 of the in-vehicle apparatus 100 as illustrated in FIG. 11B. Accordingly, the bottom face and the like of the detaching-attaching are covered, and the exterior appearance becomes further better.

As illustrated in FIG. 13C, it is preferable that the latch portion 58a and the engagement recess portion 59a are installed on the back side or the lateral side. Accordingly, when the electronic apparatus cover 200 is attached to the in-vehicle apparatus 100, the exterior appearance becomes further better because the latch portion 58a cannot be seen.

As described in FIG. 13C, it is preferable that the electronic apparatus cover 200 includes the holding portion 208 that holds the connector cover 210 that protects the second connector 30. Accordingly, it is possible to keep the electronic apparatus cover 200 and the connector cover 210 that are unnecessary when the portable apparatus 10 is attached to the in-vehicle apparatus 100, by the set. Therefore, it is possible to reduce the possibility that the electronic apparatus cover 200 and the connector cover 210 are lost.

In addition, although the holding portion 208 may be provided anywhere in the electronic apparatus cover 200, it is preferable to be provided on the back side 204 or the lateral side of the electronic apparatus cover 200. Accordingly, the exterior appearance is not destroyed when the electronic apparatus cover 200 is attached to the in-vehicle apparatus 100.

Furthermore, although the holding portion 208 may hold the connector cover 210, it is preferable that the holding portion 208 is the recess portion (another recess portion) to which the connector cover 210 is recessed. Accordingly, the holding portion 208 can hold the connector cover 210 easily. It is preferable that the connector cover 210 is composed of soft materials so that the connector cover 210 is easily recessed in the holding portion 208.

In addition, as illustrated in FIG. 15, it is preferable that the electronic apparatus cover 200 includes the partition portions 206 provided in a rectangular pattern for reinforcement on the underside, and that the lateral sides of the recess portion (another recess portion) of the holding portion 208 are composed of the partition portions. Accordingly, it is possible to reduce the production cost because the recess portion is formed with the partition portions 206 for reinforcement. Here, the lattice-shaped partition portions 206 may be provided on whole or part of the underside of the electronic apparatus cover 200.

Second Embodiment

Figure 17:
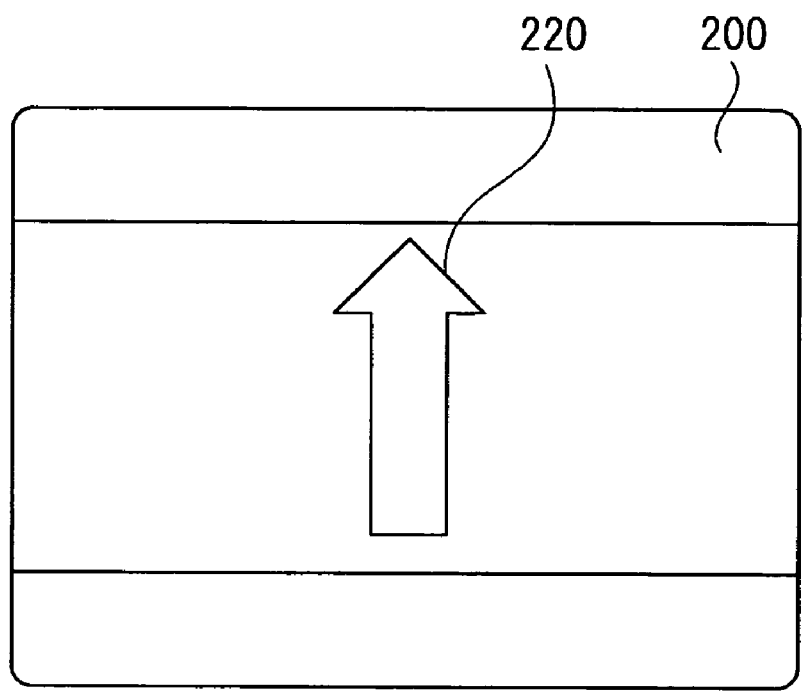
FIG. 17 is a perspective view of the electronic apparatus cover in accordance with the second embodiment.

FIG. 17 is a front view of a connector cover in accordance with the second embodiment. A display 220 that indicates the top and bottom by arrow is provided at the front face of the electronic apparatus cover 200. As illustrated, by including the display 220 that indicates the top and bottom when the electronic apparatus cover 200 is attached to the in-vehicle apparatus 100, it is possible to reduce the possibilities that the electronic apparatus cover 200 is attached upside down by mistake.

In the first embodiment and the second embodiment, although the description was given of the electronic apparatus that is the in-vehicle apparatus, the electronic apparatus may be the electronic apparatuses other than the in-vehicle apparatus such as consumer-electronics devices for example. The description was given with the example of the portable apparatus 10 that is the portable Navi as the portable apparatus. The portable apparatus may be the electronic apparatus such as the portable terminal.

Although a few specific exemplary embodiments employed in the present invention have been illustrated and described, it would be appreciated by those skilled in the art that changes may be made in these exemplary embodiments without departing from the principles and spirit of the invention, the scope of which is defined in the claims and their equivalents.

The invention claimed is:

1. An electronic apparatus cover that covers a first connector for electrically connecting to a portable apparatus of an electronic apparatus that includes a recess portion to which the portable apparatus can be attached and a first engagement portion that engages the portable apparatus, comprising:
    a second engagement portion that engages with the first engagement portion; and
    partition portions that are provided in a rectangular pattern, wherein
    the portable apparatus includes a second connector to connect to the first connector electrically, and the electronic apparatus cover includes a holding portion that holds a connector cover that protects the second connector;
    the holding portion is another recess portion in which the electronic apparatus cover is recessed, and
    the another recess portion that is the holding portion is composed of the partition portions.

* * * * *